United States Patent [19]

Shrauger et al.

[11] Patent Number: 5,262,893
[45] Date of Patent: Nov. 16, 1993

[54] METHOD AND APPARATUS FOR CREATING MULTIPLE PHASE LEVEL OPTICAL ELEMENTS

[75] Inventors: Vernon E. Shrauger, Medford; Cardinal Warde, Chestnut Hill, both of Mass.

[73] Assignee: Massachusetts Institute of Technology, Cambridge, Mass.

[21] Appl. No.: 788,306

[22] Filed: Nov. 4, 1991

[51] Int. Cl.$^5$ .......................... G02B 5/18; G02B 27/44
[52] U.S. Cl. ..................................... 359/565; 359/568; 430/321
[58] Field of Search ...................... 359/3, 24, 564, 565, 359/568; 430/321

[56] References Cited

U.S. PATENT DOCUMENTS

| | | | |
|---|---|---|---|
| 3,378,633 | 4/1968 | Macovski | 359/568 |
| 3,488,118 | 1/1970 | Parrent, Jr. et al. | |
| 3,572,900 | 3/1971 | Bouche | 359/564 |
| 3,586,434 | 6/1971 | Mueller | 359/564 |
| 3,609,010 | 9/1971 | Mueller | 359/568 |
| 3,647,943 | 3/1972 | Marshall | 359/564 |
| 3,702,725 | 11/1972 | Macovski | 359/568 |
| 3,715,461 | 2/1973 | Hanlon | |
| 3,947,105 | 3/1976 | Smith | |

OTHER PUBLICATIONS

Jahns et al, "Multilevel Phase Structures for Array Generation," *SPIE* vol. 1052: Holographic Optics: Optically and Computer Generated, 1989, pp. 198 to 203.
Swanson, "Binary Optics Technology: The Theory and Design of Multi-Level Diffractive Optical Elements," *MIT Lincoln Lab. Technical Report 854*, 1989, pp. iii to 47.
Mokry, "Unique Applications of Computer-Generated Diffractive Optical Elements," *SPIE* vol. 1052: Holographic Optics: Optically and Computer Generated, 1989, pp. 163 to 171.
Tricoles, "Computer Generated Holograms: A Historical Review," *Applied Optics*, vol. 26, No. 20, 15 Oct. 1987, pp. 4351 to 4360.
Anastasi et al, "Evaluation of Coding Schemes for Dedicated Beam Shaping CGH," IERE Conference Holographic Systems, Components and Applications, 1987, pp. 81 to 85.
Lindvold et al, "Computer-Generated Holographic Optical Elements with Grey-Level Modulation," *Journal of Physics D*, 22, pp. 735-740, 1989.
Hariharan et al, "Simplified Processing Technique for Photographic Phase Holograms," *Optics Communications*, vol. 3, No. 4, Jun. 1971, pp. 246 to 247.
Rastani et al, "Binary Phase Fresnel Lenses for Generation of Two-Dimensional Beam Arrays", *Applied Optics*, vol. 30, No. 11, 10 Apr. 1991, pp. 1347 to 1354.
Tai et al, "White-Light Pseudocolor Density Encoder," *Optics Letters*, vol. 3, No. 5, Nov. 1978, pp. 190 to 192.

*Primary Examiner*—Martin Lerner
*Attorney, Agent, or Firm*—Choate, Hall & Stewart

[57] ABSTRACT

Method and apparatus for creating discrete phase optical elements. An arbitrary phase structure is represented by color encoding to produce a color encoded mask. Thereafter, a photo-sensitive substrate is exposed to broad spectrum light transmitted through or reflected from the mask to create the discrete phase structure in the substrate. In preferred embodiments, the exposed substrate is developed and bleached (if necessary) to remove pigmentation to produce highly efficient multiple level phase structures for optical applications. The color encoded mask is produced by a computer-driven color printer resulting in very fast turnaround times.

20 Claims, 4 Drawing Sheets

*INPUT PLANE*  *OUTPUT PLANE*

METHOD AND APPARATUS FOR CREATING MULTIPLE PHASE LEVEL OPTICAL ELEMENTS

This invention was made with government support under contract Number AFOSR-86-1301 awarded by the Air Force. The government has certain rights in the invention.

BACKGROUND OF THE INVENTION

This invention relates to method and apparatus for creating multiple level phase structures in a substrate.

Certain diffractive optical elements employ spatially varying structures which alter the phase of transmitted light. An example is the Fresnel zone plate which consists of concentric annular regions, each region adapted to alter, by a desired amount, the phase of light passing through the region. The variation in phase results from a change in the index of refraction or the thickness of the material in each of the annular regions.

One known technique for altering the phase is by varying the thickness of a transparent substrate, such as glass, in correspondence with a desired phase profile. Such surface relief or kinoform structures can be fabricated by etching or by the deposition of material. Generally, a surface relief diffractive optical element having ideal characteristics would include relief structures defined by smooth profiles which are not readily fabricated with current technology. Therefore, the ideal smooth profiles are often approximated by a staircase arrangement of multiple discrete levels.

Surface relief encoding is often achieved by serial masking and etching operations performed on a glass substrate. See, for example, J. Jahns et al., "Multilevel phase structures for array generation," Proc. SPIE 1052, pp. 198-203 (1989) and G. L. Swanson, "Binary optics technology: the theory in design of multi-level diffractive optical elements" MIT Lincoln Lab. Tech. Report 854, (1989). The techniques described in these articles primarily utilize a mask and etch process in which "N" masks are required to create $2^N$ discrete phase levels. The masks, created with electron beam lithography, are capable of producing small feature sizes down to 0.2 $\mu$m. The theoretical efficiencies of Fresnel lenses produced with this technique are very high, namely, 81 percent for four levels, 95 percent for eight levels and 99 percent for sixteen levels (not including insertion losses). Computer generated holographic techniques can be used to design arbitrary phase profiles, and large numbers of these discrete phase level structures can be made by embossing plastic-based substrates with dies created from the etched glass substrate master. See, P. A. Mokry, "Unique applications of computer generated diffractive optical elements" Proc. SPIE 1052, pp. 163-171 (1989). This masking and etching process is very capital intensive, requiring a cleanroom environment, specialized machinery and caustic chemicals. The turnaround time is also quite long.

Another approach for creating computer generated holograms (CGHs) is binary phase encoding with laser printer-aided fabrication. This approach, however, yields low efficiency, off-axis holograms. One known form of CGH is the binary amplitude CGH which creates specified amplitude and phase variations by selective blocking and passing of light. See, for example, G. Tricoles, "Computer generated holography: a historical review", Applied Optics, 26, pp. 4351-4360 (1987). This technique is readily implemented with a personal computer, a conventional 300 dot per inch laser printer, and off-the-shelf high-resolution camera equipment. However, since this technique varies amplitude in a binary fashion, most of the incident light is blocked or wasted in unwanted diffraction orders. Thus, this technique suffers from low diffraction efficiency (a maximum of 10.1 percent in the Fresnel zone lens case) leaving it highly impractical for use in cascaded optical systems. See, C. W. Han, "Experimental analysis of error effects on computer generated hologram performance", Masters Thesis, Carnegie Mellon University (1987).

Another technique for creating CGHs is to use a discrete gray level plotter to implement fringes that are similar in nature to those created optically and recorded in holographic film. See, P. Anastasi et al., "Evaluation of coding schemes for dedicated beam shaping CGH," I.E.R.E. Conference Holographic Systems, Components and Applications (Cambridge, UK 1987), pp. 81-85 and L. Lindvold, "Linearisation problems in computer-generated holographic optical elements with grey-level modulation," Journal of Physics D, 22, pp. 735-740 (1989). Little attention has been paid to this technique which requires specialized gray level plotters and results in low diffraction efficiency because of its amplitude nature.

SUMMARY OF THE INVENTION

In one aspect of the invention, the method for creating discrete phase optical elements includes representing an arbitrary phase structure by color encoding. The colors can be produced either by a color mask or by a color display device. A photosensitive substrate is exposed to light transmitted through or reflected from the mask or to light presented by a color display device to create the discrete phase structure in the substrate. Particular phase levels of the arbitrary phase structure are encoded by colors selected according to the colors' corresponding optical densities. It is preferred that the mask be created by a computer driven color printer capable of creating at least eight primary colors. It is also preferred that the mask include a transparent substrate. A suitable color printer resolution is approximately 300 dots per inch. A suitable photosensitive substrate is a photographic emulsion preferably having an approximately flat spectral response to visible light.

After exposure, the photographic emulsion is developed and then bleached to remove pigmentation leaving a substantially transparent substrate retaining the discrete phase level information.

It is preferred that the apparatus for creating the discrete phase optical elements include a computer running graphics software, and a color printer driven by the computer and adapted to print the color encoded mask. Photoreduction optics are employed to reduce the pattern on the mask to a suitable size for the resulting discrete phase structure.

The present invention permits the creation of discrete phase optical elements with a one-step technique using existing color printer technology and off-the-shelf high-resolution photographic equipment. Colors from the printer map to discrete optical density levels on the photographic emulsion, and upon bleaching, the sensitized film retains discrete phase levels. Thus, one can select a discrete phase level by choosing an appropriate color, and then place that phase level at a location within the photographic emulsion in accordance with some desired and preselected mathematical function. With the present invention, K phase levels within a 0 to 2π range are definable with K total color printer colors. While the technique of the present invention results in a small sacrifice in minimum feature size, it provides a low cost, swift turnaround time system for creating the desired phase structures. Importantly, the use of existing color printer technology allows for K phase level implementation with a single mask. The use of multiple discrete phase levels allows for enhanced diffraction efficiency or less optical power loss. A typical thermal based color printer can provide eight primary colors allowing structures with eight discrete phase levels to be created. The theoretical diffraction efficiency of a Fresnel lens having eight discrete phase levels is 95 percent, excluding insertion loss. Using the process of the present invention, we have produced an eight-phase level Fresnel lens having diffraction efficiencies as high as 70 percent, excluding insertion loss.

DESCRIPTION OF THE PREFERRED EMBODIMENT

Figure 1:
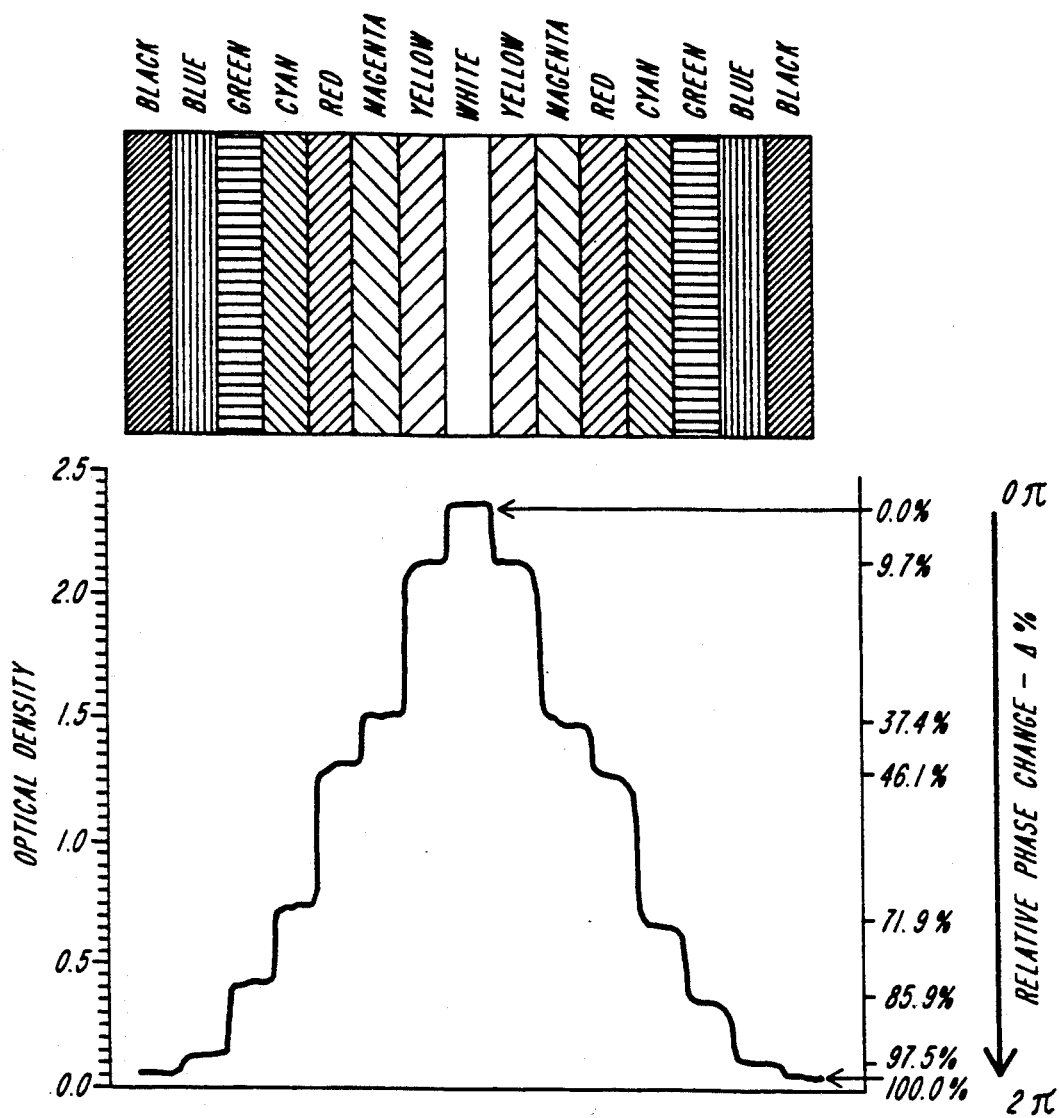
FIG. 1 is a graph of experimentally observed color to optical density mapping and color to optical phase mapping.

The theory on which the present invention is based will be briefly described first. The present invention is based on a recognition that colors act as filters when presented with white light. That is, each color reduces the spectral power density of white light by absorbing filter-specific wavelengths of light so that the resulting spectral power densities from each color filter are unique and together can be spread out in an approximately linear progression. For example, the color yellow may absorb less light passing through it than will red, and so the resulting optical density in the region of the emulsion exposed through the yellow filter will be higher than for the red filter given a flat spectral film sensitivity. Specifically, the relative optical densities for colors from a QMS Color Script 100 Model 10 printer is known for a given exposure and is shown in FIG. 1. These colors can be appropriately arranged in order of their optical densities, and as shown in FIG. 1, the optical densities form a step-like pattern when the colors are arranged in the order: white, yellow, magenta, red, cyan, green, blue and black. There is also an inverse correspondence between optical density and relative phase change, also as shown in FIG. 1. Thus, by passing white light through the appropriate pattern of colors, the transmitted intensity will be modulated in correspondence with the color pattern, and this pattern will be recorded in, for example, a photographic emulsion. Therefore, the colors provide a means for spatially varying the photographic exposure of black and white film by a single exposure through a color encoded mask, without multiple, sequentially timed exposures.

It is recognized that when black and white film is exposed with white light, the film responds differently to various wavelength components of the light to yield varying developed optical densities according to different film emulsions. Essentially the film acts as a filter in addition to the colors. Thus, the color filter response is cascaded with the film spectral response to reduce the effective exposure of white light. An important consideration in using the technique of this invention is the selection of a photosensitive substrate that has a reasonably flat spectral response or filter correctable response, to maintain the approximate linear distribution of spectral power densities from the color filters as, for example, shown in FIG. 1.

With this theoretical background, the present invention will now be described in more detail. As a first step, a desired phase profile for, for example, a Fresnel lens, is selected and a personal computer running specialized software is used to control a color printer. An example of suitable software is the PostScript ™ page descriptor programming language. This software might be used, for example, to develop concentric annular regions having the progression of colors shown in FIG. 1 and having widths determined by the particular continuous curve sought to be approximated. (See FIG. 3a.) The color printer will then print the annular regions having the appropriate colors on a transparent substrate. Recent technological advances have yielded a class of color printers that offer high resolution (300 dots per inch) with a high quality output. With powerful PostScript ™ engines, these color printers provide the user with a very flexible and powerful graphical programming language for creating CGHs.

A typical 300 dot per inch color printer thermally transfers a color pigmented wax to plastic transparencies or foils. The wax is typically colored cyan, magenta and yellow and other colors are created by the printer by overlaying two colors to create a third. An overlay of all three colors generates black. Thus, a typical thermal based color printer has eight primary colors (solid or undithered colors): white, yellow, magenta, red, cyan, green, blue and black. Solid colors are required to take full advantage of the printer's high resolution. It should be noted that additional solid colors can be created with multiple color printer masks by overlaying the different primary printer colors to yield 50 total colors for two masks or 344 total colors for three masks. Mask overlay, of course, would require that the masks be rather precisely aligned. For clarity of the discussion, the eight primary colors enumerated above will be assumed.

After the color encoded mask is created, the mask is used to expose a photosensitive substrate such as a photographic emulsion. For example, white light is passed through the mask into photoreducing optics and exposes the photographic emulsion. As described earlier, the exposed emulsion will encode a gray scale according to the optical density characteristics of the color through which the white light passed. After exposure, the emulsion is developed, and instead of being fixed, the emulsion is then bleached with a reversal bleach to remove the pigment containing exposed grains. Left behind are the unexposed grains, and it is the amount of the remaining unexposed grains which alters the index of refraction and hence the phase of light passing through that region. Thus, one has created a positive image of the mask. With spectrally flat film, the printer colors will yield optical densities that map into an approximately linear progression after a standard developing process. Bleaching of holographic film is a well-known technique for increasing the efficiency of optically generated holograms. See, S. A. Benton, "Photographic materials and their handling" in *Handbook of Optical Holography*, H. J. Caulfield, ed., (Academic Press Inc., N.Y., 1979), pp. 349-366. In the case of the present invention, bleaching is taken advantage of to yield phase levels unique to each color. It is known that optical density is proportional to this bleached phase. The bleaching process essentially removes the pigmentation from the black and white film to yield regions that produce relative phase changes in transmitted light (due to refractive index changes) distinct from adjacent regions exposed to different colors.

Figure 2:
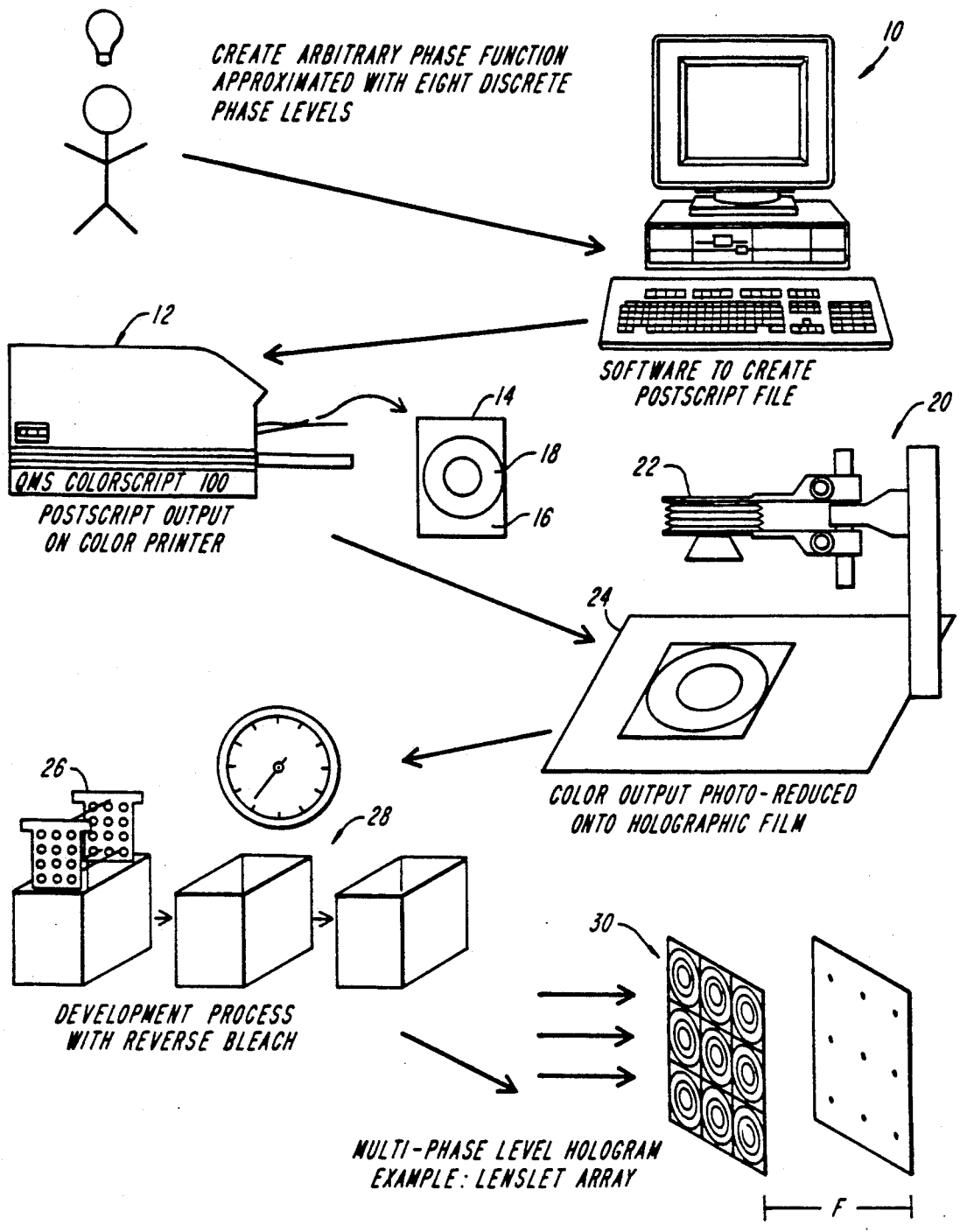
FIG. 2 is a schematic flow diagram of the method and apparatus for carrying out the present invention.

The present invention has been reduced to practice at the Massachusetts Institute of Technology. FIG. 2 schematically illustrates the overall system of the invention. As shown in the figure, the first step is the creation, by a designer, of an arbitrary phase function approximated with eight discrete phase levels. A computer 10 running PostScript software or running any word processing software is used to create a PostScript file which serves to drive a color printer 12. The color printer 12 selected for this work was a QMS Color Script 100 Model 10. This printer has eight primary colors with 300 dot per inch resolution. We restricted our initial work to eight colors only for simplicity. It should be recognized that additional colors would provide a marginal increase in efficiency. The printer 12 produced a mask 14 including a transparent substrate 16 bearing different colored regions 18. In this example, the different colored regions 18 are concentric annular regions of colors in the progression discussed above.

The mask 14 is then used with photoreduction equipment 20 so that the color output from the printer 12 is photoreduced onto holographic film.

The photoreduction equipment included a large format (4×5) Sinar camera 22 with Schneider 90 mm or 45 mm compound lenses mounted to a custom built, vibrationally stable high resolution reduction table 24. The maximum possible resolution of the system with white light and the selected camera equipment is about 200 line pairs per mm (5 μm minimum feature size). Kodak 649 F holographic film on a 4×5 glass substrate was selected for its relatively flat spectral response, high resolution, and mechanical stability. Other films could be selected and compensated with specific filters to correct for any non-uniformities in the spectral response.

After exposure using the photoreduction equipment 20, an exposed emulsion 26 is developed and reverse bleached in equipment 28. The result of this process is a multi-phase level hologram, such as a lenslet array 30 illustrated.

Figure 3A:
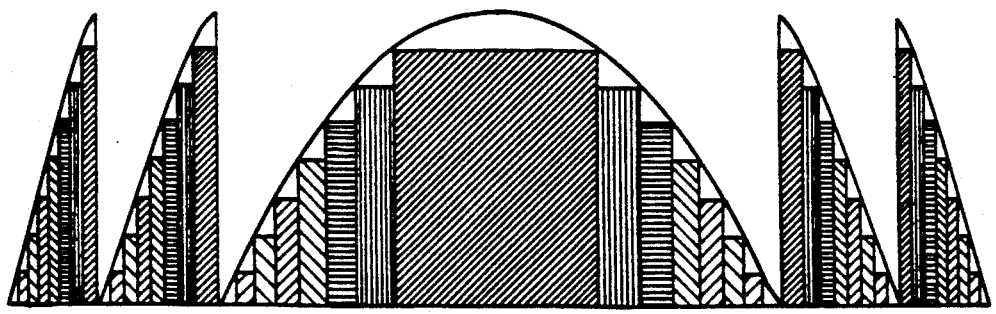
FIG. 3a is a cross-sectional view of an experimentally implemented Fresnel lens using color mapping to create the appropriate phase profile.
Figure 3B:
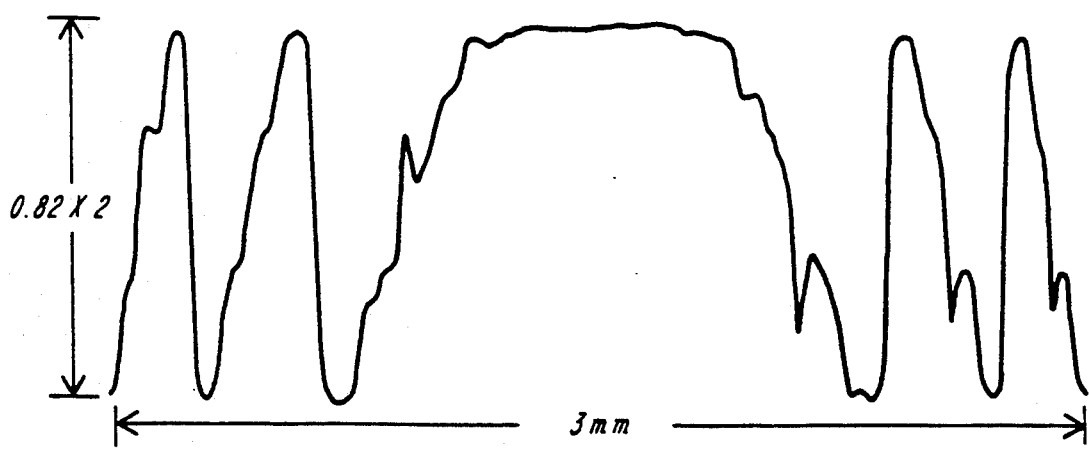
FIG. 3b is a graph of a microdensitometer scan of a typically recorded Fresnel lens before bleaching the emulsion.

The color to optical density mapping was observed to follow an approximate linear progression. A typical result is illustrated in FIG. 1 discussed above. For proof of concept purposes, we created Fresnel lenses with eight discrete phase levels that correspond to the eight colors generated by the printer 12. FIG. 3a shows a side view of the Fresnel lens and how it was created with the color printer 12. Below the side view is a microdensitometer scan shown in FIG. 3b of a representative Fresnel lens before bleach processing. Fresnel lenses in 5×5 arrays were simply created with the PostScript ™ programming language. The total measured diffraction efficiency (excluding insertion loss) of a characteristic lens made according to the invention was 68 percent with an average insertion loss of 26 percent due to scattering, absorption, and surface reflections. The bleach used was a reversal bleach based on the dichromate ion. See, P. Hariharan et al., "Simplified processing technique for photographic phase holograms," Opt. Comm. 3, pp. 246-247 (1971). This bleach created a large amount of scattering and absorption and a change to a permanganate ion-based bleach should help to reduce the scattering and absorptive losses. See, S. A. Benton, "Photographic materials and their handling" in *Handbook of Optical Holography*, H. J. Caulfield, ed., (Academic Press Inc., N.Y., 1979), pp. 349-366.

Figure 4A:
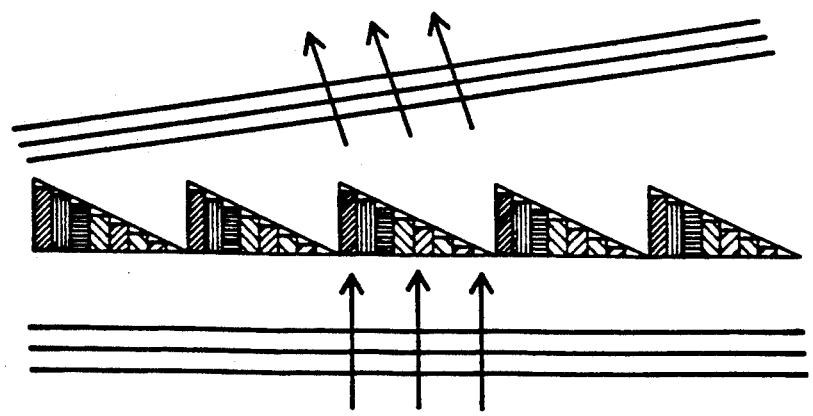
FIG. 4a is a cross-sectional view of an experimentally implemented synthetic blazed grating using techniques according to the invention.
Figure 4B:
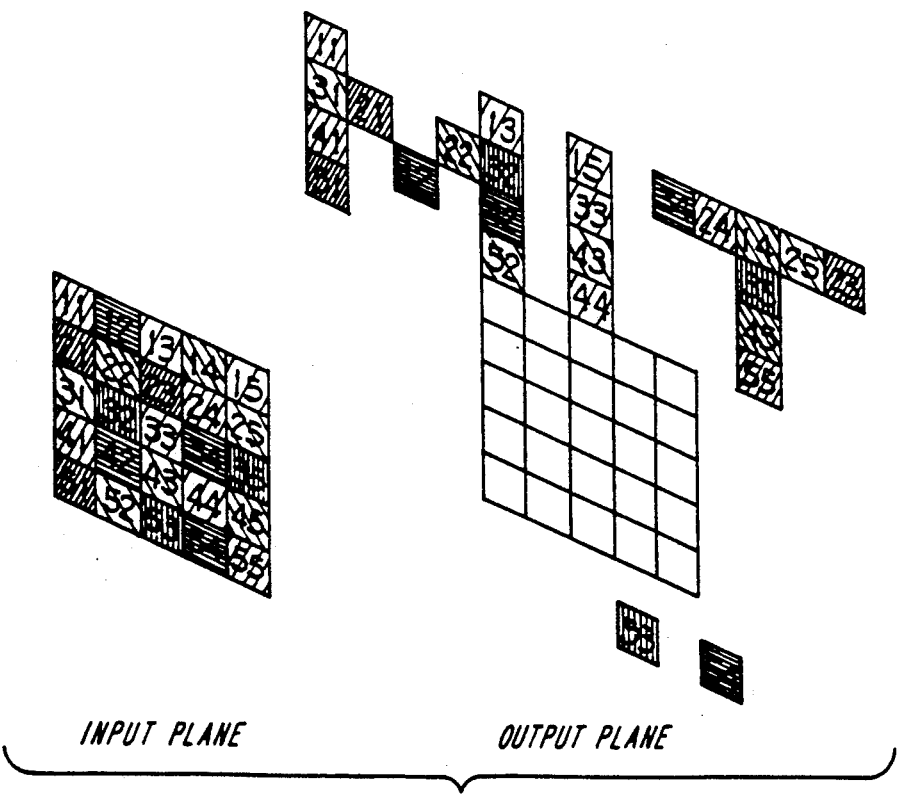
FIG. 4b is a perspective view of an arbitrary interconnection scheme using color created synthetic blazed gratings.

Another application of multiple phase level computer generated holograms of the present invention is optical interconnection. For example, we created synthetic blazed gratings with our eight colors and by varying the pitch and rotation of the gratings, we could steer light in arbitrary directions. With reference to FIG. 4a, a blazed grating 32 was made using color mapping to create the appropriate phase profile. The blazed grating 32 was used to make an interconnection CGH to spell out the letters MIT as shown in FIG. 4b. The high efficiency of the process left a very small on-axis or undiffracted light beam which suggests that on-axis optical interconnection is possible with a high signal to noise ratio. Lenslet arrays have also been sandwiched with interconnection arrays to provide magnification of interconnect pixels for sub-element interconnect holograms.

The ability to control phase and amplitude with several discrete levels allows for the construction of phase-only CGHs possessing high diffraction efficiencies, and also allows for the creation of amplitude and phase CGHs that also possess high diffraction efficiency. Amplitude and phase CGHs are created with two film plates. An amplitude-contribution mask is created and photoreduced onto a holographic film plate without bleaching. A phase-contribution mask is created and photoreduced onto a holographic film plate with bleaching as discussed above. The two plates are sandwiched together with the emulsions facing each other. Alignment can be assured by placing Fresnel zone lenses on the four corners of the amplitude mask and blazed Fresnel lenses on the four corners of the phase mask, and these lenses are then aligned for a no beam steer condition. Thereafter, the plates are glued together preserving this alignment.

The technique of the present invention provides CGH applications researchers with a very valuable tool that meets the necessary high efficiency requirements without the extremely high cost of integrated circuit processing facilities. A wide variety of applications for the process of this invention exists. A foremost application is in the design and manufacture of optical processing systems. For example, developers now have a low cost means to generate by computer: optical phase-only filters, optical interconnections, compressed holographic imaging systems/elements, and beam array generation. The short turnaround time (approximately two hours) allows engineered feedback for rapid system design and debug. The one-step process of the invention for mask photoreduction makes the manufacturing of volumes of CGHs simple.

Other applications for CGHs processed according to the invention are optical neural network processors, optical pattern recognizers, optical clock distribution elements, compact disc technology, optically connected VLSI systems, phased masks for VLSI, optical lens correction and reflective surface correction systems, wavefront correction, novel grating production, computer generated distributed volume holographic media, and optically controlled phased array antenna systems.

It should be noted that the present invention in its broadest aspect creates arbitrary discrete phase structures by exposing a photosensitive substrate to spatially varying color encoded light. Thus, other techniques for generating spatially varying color encoded light can be used to expose a photosensitive substrate. Thus, the invention is not limited to first creating a color encoded mask as discussed previously. For instance, in place of a color-encoded mask, one can use spatially varying, colored light directly to expose a photosensitive substrate.

What is claimed is:

1. Method for creating discrete phase optical elements having K phase levels, where K is greater than 2, comprising:
   representing a preselected phase structure by color encoding to produce a color encoded mask; and
   exposing a photosensitive substrate to light transmitted through or reflected from the mask to create the discrete phase structure having K phase levels, where K is greater than 2, in the substrate.

2. The method of claim 1 wherein particular phase levels of the arbitrary phase structure are encoded by colors selected according to the colors' corresponding optical densities.

3. The method of claim 1 wherein the mask is created by a computer driven color printer.

4. The method of claim 3 wherein the color printer can create at least three colors.

5. The method of claim 3 wherein the color printer has a resolution greater than 10 dots per inch.

6. The method of claim 1 wherein the mask is created by a computer driven display device.

7. The method of claim 1 wherein the mask includes a transparent substrate.

8. The method of claim 1 wherein the mask includes an opaque, reflective substrate.

9. The method of claim 1 wherein the photosensitive substrate has an approximately flat spectral response to visible light.

10. The method of claim 1 wherein the photosensitive substrate spectral response is filter corrected for an approximate flat spectral response to visible light.

11. The method of claim 1 wherein cascaded color masks are used to create compensating colors for non-flat spectral response photosensitive substrates.

12. The method of claims 9 or 10 or 11 wherein the photosensitive substrate is a photographic emulsion.

13. The method of claim 12 further including developing the photographic emulsion.

14. The method of claim 13 further including bleaching the photographic emulsion to remove pigmentation.

15. The method of claims 9 or 10 or 11 wherein the photosensitive substrate is a photopolymer material, dichromated gelatin, photoresist, photorefractive material, or other photosensitive material that is capable of phase-only recording.

16. The method of claim 15 further including appropriate processing to establish the phase structure within the photosensitive substrate.

17. Apparatus for creating discrete phase optical elements having K phase levels, where K is greater than 2, comprising:
   apparatus for generating spatially varying color encoded light; and
   a photosensitive substrate exposed to the color encoded light, and a preselected discrete phase structure having K phase levels, where K is greater than 2, is created in the substrate.

18. Apparatus for creating phase optical elements having K phase levels, where K is greater than 2, comprising:
   a color encoded mask; and
   a photosensitive substrate exposed to light transmitted through or reflected from the mask, and a preselected discrete phase structure having K phase levels, where K is greater than 2, is created in the substrate.

19. The apparatus of claim 18 further including a computer running software; and
   a color printer driven by the computer and adapted to print the color encoded mask.

20. The apparatus of claim 18 wherein the apparatus for exposing the photosensitive substrate includes photoreduction optics.

* * * * *